US009780710B2

(12) United States Patent
Rose, Jr. et al.

(10) Patent No.: US 9,780,710 B2
(45) Date of Patent: Oct. 3, 2017

(54) REACTIVE POWER CONTROL FOR WIND TURBINE GENERATORS

(71) Applicant: General Electric Company, Schenectady, NY (US)

(72) Inventors: Raymond Francis Rose, Jr., Niskayuna, NY (US); Enno Ubben, Steinfurt (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 539 days.

(21) Appl. No.: 14/253,221

(22) Filed: Apr. 15, 2014

(65) Prior Publication Data

US 2015/0295529 A1    Oct. 15, 2015

(51) Int. Cl.
| | | |
|---|---|---|
| H02P 9/30 | (2006.01) | |
| F03D 7/02 | (2006.01) | |
| H02P 9/00 | (2006.01) | |
| F03D 9/00 | (2016.01) | |
| H02J 3/38 | (2006.01) | |
| F03D 9/25 | (2016.01) | |
| F03D 7/04 | (2006.01) | |

(52) U.S. Cl.
CPC .............. *H02P 9/305* (2013.01); *F03D 7/028* (2013.01); *F03D 7/0272* (2013.01); *F03D 7/0284* (2013.01); *F03D 7/048* (2013.01); *F03D 9/00* (2013.01); *F03D 9/25* (2016.05); *F03D 9/257* (2017.02); *H02P 9/00* (2013.01); *H02J 3/386* (2013.01); *Y02E 10/70* (2013.01); *Y02E 10/723* (2013.01)

(58) Field of Classification Search
None
See application file for complete search history.

(56) References Cited

U.S. PATENT DOCUMENTS

| | | | |
|---|---|---|---|
| 7,994,658 B2 | 8/2011 | Cardinal et al. | |
| 2008/0150283 A1 | 6/2008 | Rivas et al. | |
| 2011/0133461 A1 | 6/2011 | Hjort | |
| 2014/0062086 A1* | 3/2014 | Mata Dumenj | H02J 3/1842 290/44 |

(Continued)

FOREIGN PATENT DOCUMENTS

| | | |
|---|---|---|
| WO | 2012016585 A1 | 2/2012 |
| WO | 2014071948 A1 | 5/2014 |

OTHER PUBLICATIONS

Beal, Vangie, "The Differences Between Thick & Thin Client Hardware", Jul. 6, 2006.*

(Continued)

*Primary Examiner* — Qing Wu
(74) *Attorney, Agent, or Firm* — Dority & Manning, PA

(57) ABSTRACT

Wind farms and methods for operating wind farms are provided. A wind farm includes a plurality of wind turbine generators. A method includes determining an available reactive power value for each of the plurality of wind turbine generators. The method further includes distributing an individual reactive power command to each of the plurality of wind turbine generators. The individual reactive power command is individually tailored to each wind turbine generator of the plurality of wind turbine generators based on the available reactive power value for that wind turbine generator.

20 Claims, 2 Drawing Sheets

(56) References Cited

U.S. PATENT DOCUMENTS

2015/0275862 A1* 10/2015 Babazadeh .............. H02J 3/18
　　　　　　　　　　　　　　　　　　　　　　290/44

OTHER PUBLICATIONS

Merahi et al., "Control Algorithm of Active and Reactive Power Generation for Wind Farm", ICEEAC International Conference on Electrical Engineering and Automatic Control, Nov. 2013.
European Search Report and Opinion issued in connection with corresponding EP Application No. 15163280.9 dated Jul. 24, 2015.

* cited by examiner

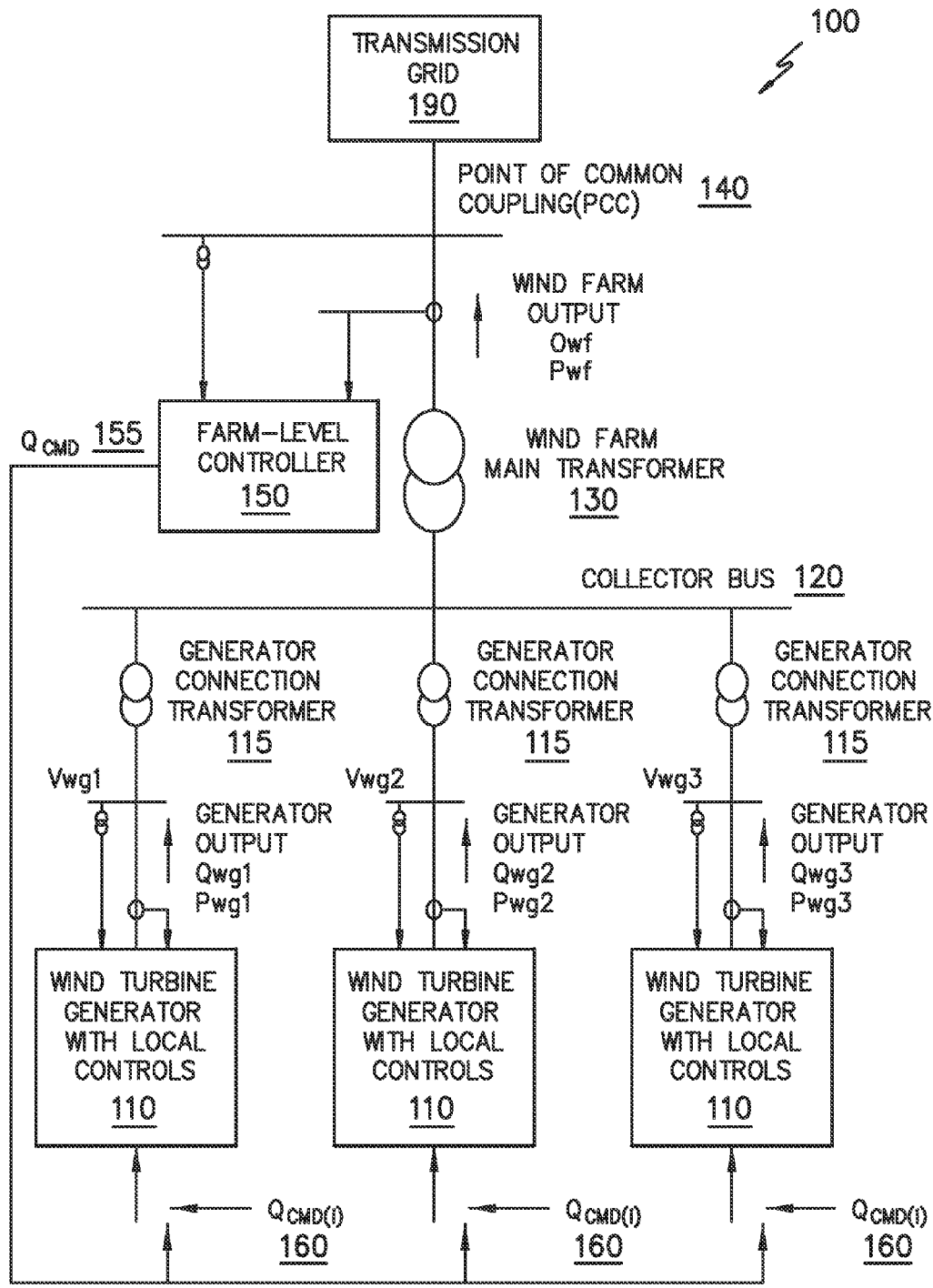
FIG. -1-

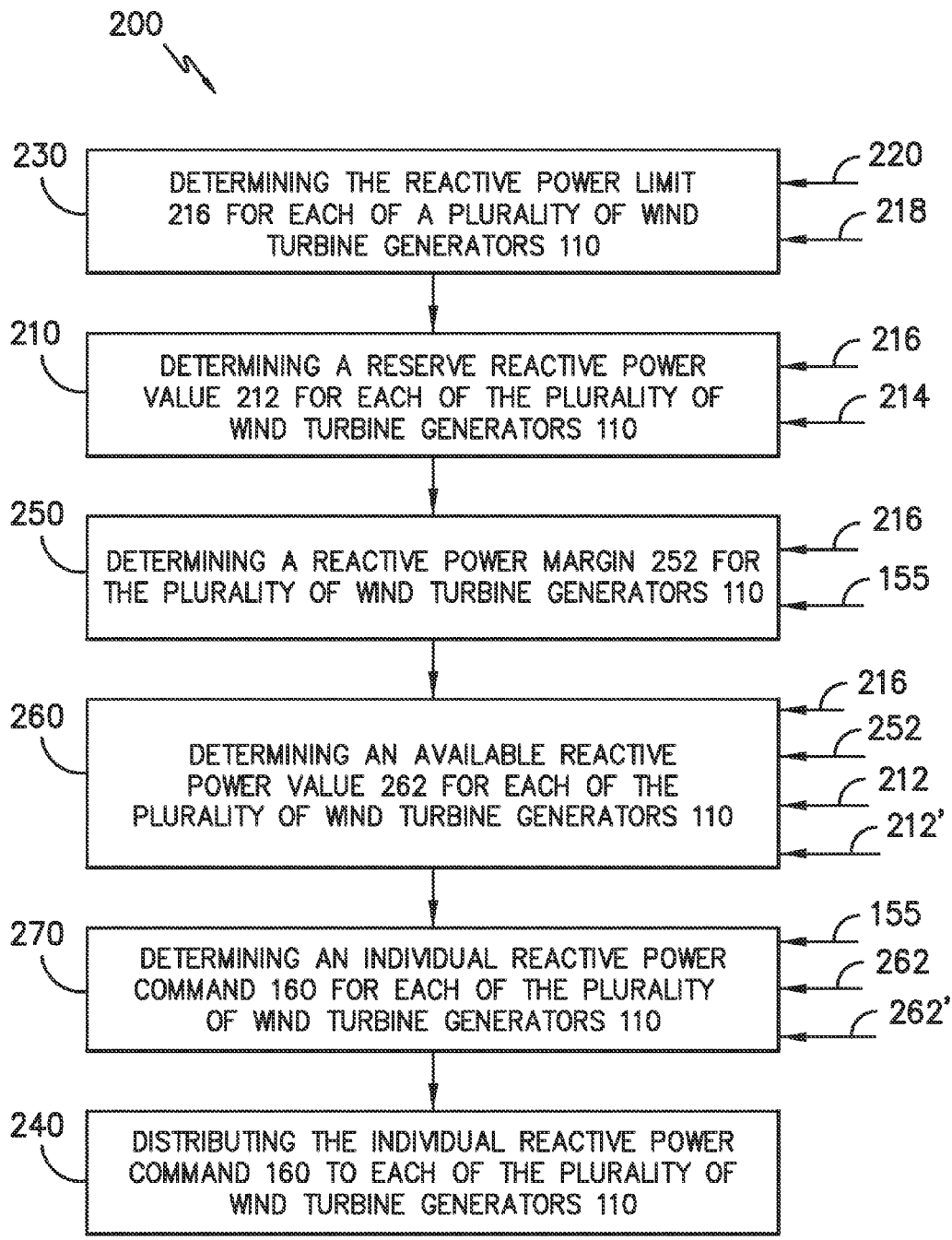
FIG. -2-

REACTIVE POWER CONTROL FOR WIND TURBINE GENERATORS

FIELD OF THE INVENTION

The present subject matter relates generally to wind turbine generators and, more particularly, to control systems and techniques for use with wind turbine generators which provide improved reactive power command distribution and resulting improved wind farm performance.

BACKGROUND OF THE INVENTION

Wind power is considered one of the cleanest, most environmentally friendly energy sources presently available, and wind turbine generators have gained increased attention in this regard. A modern wind turbine generator typically includes a wind turbine and a generator. The wind turbine typically includes a tower, gearbox, nacelle, and one or more rotor blades. The generator is typically housed in the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid. Further, wind turbine generators are typically grouped together in a wind farm, and may be onshore or offshore.

Wind power generation is typically provided by a wind "farm" having a large number (often 100 or more) of wind turbine generators. Each individual wind turbine generator typically experiences a unique wind force. Various other factors may additionally effect the performance of individual wind turbine generators during wind farm operation. Accordingly, the output power for each individual wind turbine generator may by individualized, and may vary from wind turbine generator to wind turbine generator.

As is generally understood, active power and reactive power are provided by each wind turbine generator. A park-level controller provides reactive power commands to the wind turbine generators, based on transmission grid needs. Typically, such commands are identical for each wind turbine generator. Such approach, however, has disadvantages. For example, due to apparent power limitations, an individual wind turbine which is generating a substantial amount of active power may be forced to curtail such active power generation in order to meet a required reactive power level. On a wind farm level setting, many individual wind turbine generators can be curtailed due to identical reactive power commands, thus resulting in significant active power losses.

Accordingly, improved wind farms and methods for operating wind farms are desired. In particular, improved methods and control systems which reduce curtailment and active power losses due to reactive power commands would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, a method for operating a wind farm is provided. The wind farm includes a plurality of wind turbine generators. The method includes determining an available reactive power value for each of the plurality of wind turbine generators. The method further includes distributing an individual reactive power command to each of the plurality of wind turbine generators. The individual reactive power command is individually tailored to each wind turbine generator of the plurality of wind turbine generators based on the available reactive power value for that wind turbine generator.

In accordance with another embodiment, a wind farm is provided. The wind farm includes a plurality of wind turbine generators, and a farm-level controller in communication with each of the plurality of wind turbine generators. The farm-level controller is operable for determining an available reactive power value for each of the plurality of wind turbine generators. The farm-level controller is further operable for distributing an individual reactive power command to each of the plurality of wind turbine generators. The individual reactive power command is individually tailored to each wind turbine generator of the plurality of wind turbine generators based on the available reactive power value for that wind turbine generator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a block diagram of a wind farm having multiple wind turbine generators coupled with a transmission grid; and FIG. 2 illustrates a flow diagram of one embodiment of a method in accordance with the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to methods and wind farms which provide individualized reactive power commands to individual wind turbine generators in a wind farm. The reactive power command for each individual wind turbine generator is advantageously based on an available reactive power value for that wind turbine generator. Accordingly and advantageously, individual wind turbine generators which are providing relatively more active power will receive relatively smaller individualized reactive power commands, and individual wind turbine generators which are providing relatively less active power will receive relatively larger individualized reactive power commands. This reduces and in some cases eliminates curtailment of individual wind turbine generators which are providing relatively more active power, thus increasing the active power produced by the wind park generally relative to increased farm level reactive power commands for the wind park generally.

Individual reactive power commands are advantageously distributed to individual wind turbine generators proportionally to the available reactive power for each individual wind turbine generator. In exemplary embodiments, when distributing individual reactive power commands, distribution is determined first for the individual wind turbine generator with the largest available reactive power value, and generally distributed to individual wind turbine generators from largest available reactive power value to smallest available reactive power value, until the farm level reactive power command has been fully allocated to individualized wind turbine generators.

Notably, in exemplary embodiments, methods and control system in accordance with the present disclosure, such as the various steps disclosed herein, may occur when the farm level reactive power command is greater than a sum of reactive power limits for each of the plurality of wind turbine generators in the wind farm, such as only in this case.

Referring to the drawings, FIG. 1 illustrates a block diagram of a wind farm 100 having multiple wind turbine generators 110 coupled with a transmission grid 190. Specifically, as shown, the wind farm 100 includes three wind turbine generators 110. However, it should be appreciated that the wind farm 100 may generally include any number of wind turbine generators 110.

Each wind turbine generator 110 may include a local controller that is responsive to the conditions of the wind turbine generator being controlled. In one embodiment, the controller for each wind turbine generator 110 senses the terminal voltage and current (via potential and current transformers). The voltage and current sensed are used by the local controller to provide an appropriate response to cause the wind turbine generator 110 to provide the desired reactive power and voltage.

Referring still to FIG. 1, each wind turbine generator 110 is coupled to a collector bus 120 through generator connection transformers 115 to provide real and reactive power (labeled $P_{wg}$ and $Q_{wg}$, respectively) to the collector bus 120. Generator connection transformers and collector buses are well known in the art and, thus, will not be described in detail herein.

The wind farm 100 provides real and reactive power output (labeled $P_{wf}$ and $Q_{wf}$, respectively) via a wind farm main transformer 130. A farm level controller 150 senses the wind farm output as well as the voltage at a point of common coupling 140 to provide a farm level reactive power command ($Q_{cmd}$) 155. As discussed herein, the farm level reactive power command 155 is then divided into individual reactive power commands ($Q_{cmd(i)}$) 160 which are distributed to the individual wind turbine generators 110.

Farm level controller 150 and the local controllers for each individual wind turbine generator 110 may each correspond to any suitable computing device and/or any combination of computing devices. For instance, a controller may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller to perform various functions, such as the steps disclosed herein.

Referring now to FIG. 2, a flow chart illustrating various steps of a method in accordance with embodiments of the present disclosure is provided. It should additionally be understood that a suitable control system, such as farm level controller 150, may be operable to perform such steps. A method for operating a wind farm 200 accordingly may include, for example, the step 210 of determining a reserve reactive power value ($Q_{delta(i)}$) 212 for each of the plurality of wind turbine generators 110. The reserve reactive power value 212 is generally an indication of the amount of extra active power generation that a wind turbine generator 110 is capable of providing beyond a current level. Notably, for each wind turbine generator 110, a rated reactive power value ($Q_{rated(i)}$) 214 may be provided, which establishes an absolute maximum reactive power level. Additionally, a reactive power limit ($Q_{limit(i)}$) 216 may be determined. The reactive power limit 216 is generally a limit for real time reactive power production for a wind turbine generator 110 relative to an active power output ($P_{actual(i)}$) 218 and an apparent power limit ($S_{limit(i)}$) 220 for that wind turbine generator 110. The reserve reactive power value 212 for each wind turbine generator 110 may be based on the reactive power limit 216 for that wind turbine generator 110, and may further be based on other suitable variables. For example, in exemplary embodiments, method 200 may further include the step 230 of determining the reactive power limit 216 for each of the plurality of wind turbine generators 110 based on the active power output 218 and apparent power limit 220 for that wind turbine generator 110. A reactive power limit 216 may for example be determined using the following equation:

$$Q_{limit(i)} = \sqrt{S_{limit(i)}^2 - P_{actual(i)}^2}$$

It should generally be understood that the reactive power limit 216 for a wind turbine generator 110 may fluctuate based on the current active power output 218. Because the reactive power limit 216 is based on the active power output 218 and the apparent power limit 220, the reactive power limit 216 may represent a threshold for the reactive power. When the individual reactive power command 160 to an individual wind turbine generator 110 increases above the reactive power limit 216, the wind turbine 110 must begin curtailing active power output 218. Notably, utilization of methods in accordance with the present disclosure reduces or eliminates the need for such curtailment by distributing individual reactive power commands 160 to individual wind turbine generators 110 based on reserve reactive power values 212 for the individual wind turbine generators 110, as discussed herein.

The reserve reactive power value 212 for each wind turbine generator 110 may in exemplary embodiments be equal to a difference between the rated reactive power value 214 and the reactive power limit 216 for that individual wind turbine. A reserve reactive power value 212 may thus be determined based on the following equation:

$$Q_{delta(i)} = Q_{rates(t)} - Q_{limit(i)}$$

Notably, in exemplary embodiments, the determining step 210 may occur when the farm level reactive power command 155 is greater than a sum of reactive power limits 216 for each of the plurality of wind turbine generators 110, such as in some embodiments only in these instances. Accordingly, if the wind farm 100 generally is required to produce excess reactive power, methods in accordance with the present disclosure may be utilized to facilitate such production while reducing or eliminating the need for curtailment of active power output 218.

Method 200 may further include the step 240 of distributing an individual reactive power command 160 to each of the plurality of wind turbine generators 110. The individual reactive power command 160 for each individual wind turbine generator 110 may be individually tailored to that wind turbine generator 110 based on the reserve reactive power value 212 (as well as the reactive power limit 216 and other variables utilized to determine the reserve reactive power value 212) for that wind turbine generator 110. Accordingly, for example, individual wind turbine generators 110 which have relatively greater reserve reactive power values 212 may be distributed relatively higher individual reactive power commands 160, while individual wind turbine generators 110 which have relatively lesser reserve reactive power values 212 may be distributed relatively lesser individual reactive power commands 160. Accordingly, curtailment of individual wind turbine generators 110 which are providing relatively more active power output 218, and thus have correspondingly less reserve reactive power, may not be required.

Various additional steps may be utilized to determine the individual reactive power command 160 for each individual wind turbine generator 110. For example, in some embodiments, a method in accordance with the present disclosure may include the step 250 of determining a reactive power margin ($Q_{margin}$) 252 for the plurality of wind turbine generators. The reactive power margin 252 is generally an amount of additional reactive power required for a farm level reactive power command 155, based on the reactive power limits 216 of the wind turbine generators 110. For example, in some embodiments, the reactive power margin 252 may be equal to a difference between a farm level reactive power command 155 and a sum of reactive power limits 216 for each of the plurality of wind turbine generators 110. The following equation may, for example, be utilized:

$$Q_{margin} = \text{Max}\left(Q_{cmd} - \sum_{i=0}^{n} Q_{limit(i)}, 0\right)$$

A method in accordance with the present disclosure may further include, for example, the step 260 of determining an available reactive power value ($Q_{distr(i)}$) 262 for each wind turbine generator 110. The available reactive power value 262 is generally a total amount of reactive power that each individual wind turbine generator 110 would be capable of producing, in proportion to the other individual wind turbine generators 110 in the wind farm 100, such that the farm level reactive power command 155 is satisfied. Such value for each wind turbine generator 110 is generally proportional to the power output for that wind turbine generator 110, with the available reactive power value 262 being relatively and proportionally smaller for a wind turbine generator 110 that is producing relatively more active power output 218 and vice versa. For example, in some embodiments, the available reactive power value 262 for each wind turbine generator 110 is determined based on the reactive power limit 216 for that wind turbine generator 110, the reactive power margin 252, the reserve reactive power value 212 for that wind turbine generator 110, and a sum of like-signed reserve reactive power values ($Q_{delta(k)}$) 212' of the plurality of wind turbine generators 110. The like-signed reserve reactive power values 212' may be positive or negative. It should be understood that in exemplary embodiments, such step 260 may be performed separately for positive and negative reserve reactive power values 212', to account for all wind turbine generators 110 in a wind farm 100. The following equation may, for example, be utilized:

$$Q_{distr(i)} = Q_{limit(i)} + \left(Q_{margin} * \frac{Q_{delta(i)}}{\Sigma_{k=0}^{n} Q_{delta(k)}}\right)$$

Notably, in exemplary embodiments, the determining step 260 may occur when the farm level reactive power command 155 is greater than a sum of reactive power limits 216 for each of the plurality of wind turbine generators 110, such as in some embodiments only in these instances. Accordingly, if the wind farm 100 generally is required to produce excess reactive power, methods in accordance with the present disclosure may be utilized to facilitate such production while reducing or eliminating the need for curtailment of active power output 218.

A method in accordance with the present disclosure may further include, for example, the step 270 of determining the individual reactive power command 160 for each of the plurality of wind turbine generators 110. As discussed, the individual reactive power command 160 for each wind turbine generator 110 is an individually tailored amount for each wind turbine generator 110, based on the power output of that individual wind turbine generator 110 so as to reduce or prevent curtailment of various wind turbine generators 110 in the wind farm 100. In some embodiments, for example, the individual reactive power command 160 is determined based on the farm level reactive power command 155, the available reactive power value 262 for that wind turbine generator 110, and a sum of like-signed available reactive power values ($Q_{distr(k)}$) 262' for the plurality of wind turbine generators 110. The like-signed available reactive power values 262' may be positive or negative. It should be understood that in exemplary embodiments, such step 270 may be performed separately for positive and negative available reactive power values 262', to account for all wind turbine generators 110 in a wind farm 100. The following equation may, for example, be utilized:

$$Q_{cmd(i)} = Q_{cmd} * \frac{Q_{distr(i)}}{\Sigma_{k=1}^{n} Q_{distr(k)}}$$

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind farm, the wind farm comprising a plurality of wind turbine generators and a farm level controller, the method comprising:
   calculating, with the farm level controller, an available reactive power value for each of the plurality of wind turbine generators;
   distributing an individual reactive power command to each of the plurality of wind turbine generators, the individual reactive power command individually tailored to each wind turbine generator of the plurality of wind turbine generators based on the corresponding available reactive power value of each of the plurality wind turbine generators; and
   providing, with each wind turbine generator of the plurality of wind turbine generators, a desired reactive power based on the corresponding individual reactive power command.

2. The method of claim 1, wherein the available reactive power value is determined based on a reactive power limit for that wind turbine generator, a reactive power margin, a reserve reactive power value for that wind turbine generator, and a sum of like-signed reserve reactive power values of the plurality of wind turbine generators.

3. The method of claim 2, wherein the reserve reactive power value for each of the plurality of wind turbine generators is equal to a difference between a rated reactive power value and the reactive power limit for that wind turbine generator.

4. The method of claim 2, further comprising determining the reactive power limit for each of the plurality of wind turbine generators based on an apparent power limit and an active power output for that wind turbine generator.

5. The method of claim 1, further comprising determining a reactive power margin for the plurality of wind turbine generators.

6. The method of claim 5, wherein the reactive power margin is equal to a difference between a farm level reactive power command and a sum of reactive power limits for each of the plurality of wind turbine generators.

7. The method of claim 1, further comprising determining the individual reactive power command for each of the plurality of wind turbine generators.

8. The method of claim 7, wherein the individual reactive power command is determined based on a farm level reactive power command, the available reactive power value for that wind turbine generator, and a sum of like-signed available reactive power values for the plurality of wind turbine generators.

9. The method of claim 1, further comprising determining a reserve reactive power value for each of the plurality of wind turbine generators, the reserve reactive power value for each of the plurality of wind turbine generators based on a reactive power limit for that wind turbine generator.

10. The method of claim 1, wherein the determining step occurs when a farm level reactive power command is greater than a sum of reactive power limits for each of the plurality of wind turbine generators.

11. A wind farm, comprising:
   a plurality of wind turbine generators; and
   a farm-level controller in communication with each of the plurality of wind turbine generators, the farm-level controller operable for:
      calculating an available reactive power value for each of the plurality of wind turbine generators; and
      distributing an individual reactive power command to each of the plurality of wind turbine generators, the individual reactive power command individually tailored to each wind turbine generator of the plurality of wind turbine generators based on the corresponding available reactive power value of each of the plurality wind turbine generators.

12. The wind farm of claim 11, wherein the available reactive power value is determined based on a reactive power limit for that wind turbine generator, a reactive power margin, a reserve reactive power value for that wind turbine generator, and a sum of like-signed reserve reactive power values of the plurality of wind turbine generators.

13. The wind farm of claim 12, wherein the reserve reactive power value for each of the plurality of wind turbine generators is equal to a difference between a rated reactive power value and the reactive power limit for that wind turbine generator.

14. The wind farm of claim 12, wherein the farm-level controller is further operable for determining the reactive power limit for each of the plurality of wind turbine generators based on an apparent power limit and an active power output for that wind turbine generator.

15. The wind farm of claim 11, wherein the farm-level controller is further operable for determining a reactive power margin for the plurality of wind turbine generators.

16. The wind farm of claim 15, wherein the reactive power margin is equal to a difference between a farm level reactive power command and a sum of reactive power limits for each of the plurality of wind turbine generators.

17. The wind farm of claim 11, wherein the farm-level controller is further operable for determining the individual reactive power command for each of the plurality of wind turbine generators.

18. The wind farm of claim 17, wherein the individual reactive power command is determined based on a farm level reactive power command, an available reactive power value for that wind turbine generator, and a sum of like-signed available reactive power values for the plurality of wind turbine generators.

19. The wind farm of claim 11, further comprising determining a reserve reactive power value for each of the plurality of wind turbine generators, the reserve reactive power value for each of the plurality of wind turbine generators based on a reactive power limit for that wind turbine generator.

20. The wind farm of claim 11, wherein the determining step occurs when a farm level reactive power command is greater than a sum of reactive power limits for each of the plurality of wind turbine generators.

* * * * *